US009125000B2

(12) United States Patent
LaMarca et al.

(10) Patent No.: US 9,125,000 B2
(45) Date of Patent: Sep. 1, 2015

(54) LOCATION-AWARE MOBILE APPLICATION MANAGEMENT

(71) Applicant: Intel Corporation, Santa Clara, CA (US)

(72) Inventors: Anthony G. LaMarca, Seattle, WA (US); Kirk W. Skeba, Fremont, CA (US); Jaroslaw J. Sydir, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/715,356

(22) Filed: Dec. 14, 2012

(65) Prior Publication Data

US 2014/0171052 A1 Jun. 19, 2014

(51) Int. Cl.
*H04M 3/00* (2006.01)
*H04W 24/00* (2009.01)
*H04W 4/00* (2009.01)
*H04W 4/02* (2009.01)

(52) U.S. Cl.
CPC ............... *H04W 4/001* (2013.01); *H04W 4/02* (2013.01)

(58) Field of Classification Search
CPC .................................. H04W 4/02; H04W 4/16
USPC ............. 455/456.1, 404.2, 456.2, 456.3, 418, 455/415, 457; 370/328; 701/119; 342/357.64
See application file for complete search history.

(56) References Cited

U.S. PATENT DOCUMENTS

| 8,577,389 | B2* | 11/2013 | Lin et al. ................. 455/456.1 |
| 2007/0232323 | A1* | 10/2007 | Spriestersbach .......... 455/456.1 |
| 2012/0123667 | A1* | 5/2012 | Gueziec ..................... 701/119 |
| 2014/0063311 | A1* | 3/2014 | McCauley et al. ....... 348/333.01 |

FOREIGN PATENT DOCUMENTS

| KR | 10-2011-0006259 A | 1/2011 |
| KR | 10-2012-0093050 A | 8/2012 |
| KR | 10-2012-0122770 A | 11/2012 |

OTHER PUBLICATIONS

International Search Report and Written Opinion received for PCT Application No. PCT/US2013/047806, mailed on Jul. 29, 2013, 9 pages.

* cited by examiner

*Primary Examiner* — Kiet Doan
(74) *Attorney, Agent, or Firm* — Forefront IP Lawgroup, PLLC

(57) ABSTRACT

Described herein are techniques related to managing mobile applications ("apps") of a mobile device based, at least in part, upon the determined location of the device. The techniques described herein are especially suited for situations where the present location differs from the locations associated with particular apps that are already installed on the mobile device. This Abstract is submitted with the understanding that it will not be used to interpret or limit the scope or meaning of the claims.

22 Claims, 6 Drawing Sheets

LOCATION-AWARE MOBILE APPLICATION MANAGEMENT

BACKGROUND

The use of mobile devices, such as smartphones, is nearly ubiquitous. Many of these mobile devices include the capability to determine their physical location. That is, the mobile device is capable of determining its location in the physical world. Conventionally location determination is typically accomplished by using Global Positioning Systems (GPS), some form of triangulation or interpolation of multiple radio signals, internet protocol (IP) geo-location, or some combination thereof.

A collection of so-called location-based services (LBS) are emerging that take advantage of the location-detection capability of the mobile devices that so many people are carrying with them each day. For example, LBSs include targeted advertising, social networking, locating friends ("check-ins"), photo tagging, life logging, location-based games, fitness monitoring, and others. Location-based services may include vehicle or parcel tracking as well.

With the ubiquitous nature of the mobile devices comes the ubiquitous use of the mobile applications ("apps") on such devices. Typically, a user downloads such apps from application distribution platforms and installs the apps on the mobile device.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
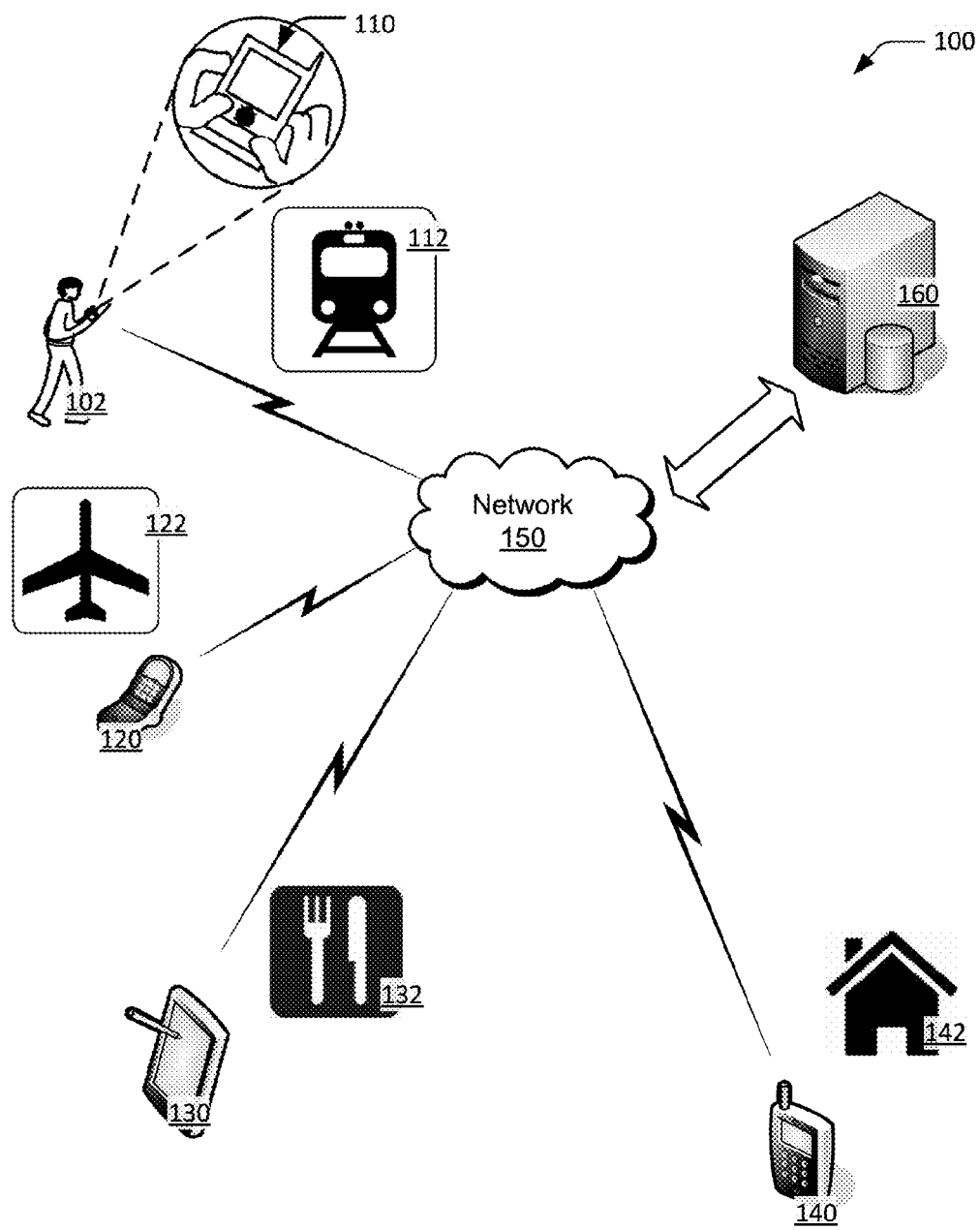
FIG. 1 shows example scenarios to illustrate implementations in accordance with the technologies described herein.

Disclosed herein are technologies for managing mobile applications ("apps") of a mobile device based, at least in part, upon the determined location of the device. This may include, for example, helping a user of a mobile device easily find apps that are appropriate and best for the current location. Such apps may be ones already installed on the mobile device or apps that are recommended for installation for particular locations. The disclosed technologies may also include automatic or recommended activation of location-specific apps. Similarly, such technologies may include automatic or recommended deactivation of location-specific apps.

Often the apps running on mobile devices (such as smartphones and tablets) are designed for use in specific locations or types of locations. Some examples include a university campus map, a regional subway application, or information related to a particular neighborhood or city location. An example of an application that is useful in specific types of locations is a baseball scoring application, which is useful while at a baseball game.

Unfortunately, using conventional approaches, a user of a mobile device can find it difficult to find applications associated with or appropriate for a specific location and to cull the valuable ones from the less helpful ones out of literally millions of available apps. With the technology disclosed here, a user can arrive in a location and have his or her mobile device provide a list of one or more apps that are appropriate for the specific location.

If the user arrives in New York City, for example, there is a tremendous number of available apps to assist in finding museums, restaurants, or even the subway schedule. Those available apps vary in degree of quality and location appropriateness. The technology described herein will help the user in finding which location-specific apps are available and which ones are ones are valuable to that user.

Another concern not adequately addressed by the conventional approaches is how to manage already installed location-specific applications based the appropriateness for the current location. When the user leaves a particular location where location-specific applications is appropriate, the technology described herein ends or deactivates the location-specific applications. For example, the user is not interested in alerts about delays in the New York City subway system when in Spokane, Wash. On the other hand, when the user travels back to New York City, the user wants the applications associated with New York City to be updated and enabled.

The identification of apps that are appropriate for a particular location can also be used more generally to predict the apps that a user will run/use at any point in the day. As the user traverses the places and routes that he normally travels, the mobile device keeps track of the apps associated with each location (place/route).

Over time, the mobile device builds up knowledge of the apps most likely to be run in each location and can use this information to, for example, determine which apps to offload to a low power core used to run key applications while the device is in a low power state.

In short, the technology described herein helps a user to gain the benefits of location-specific applications without requiring a large amount of manual application searching, maintenance and handling.

Conventional approaches require a large amount of the user's time and manual input. When searching for applications, users can query for specific applications but they have to actively do so with keyword searches or knowledge of the type of application they are looking for. When dealing with applications installed on their device, users must manually turn off notifications for each application and manually turn them on when they need them again. Furthermore, users must remember which applications are related to which location or try to manually arrange them in ways that makes this process easier.

Limited Resources

A mobile device has limited resources. Some of those include screen real estate, memory, battery life, and other allocable resources. In addition, the user's own resources are limited. The technologies disclosed herein manage these resources of the mobile device based upon the determined location of the device.

A mobile device has a defined and limited display size, also called screen real estate. Because of this a device can only show a limited number of icons on one screen. The icons are associated with apps installed on the device and the user activates an app by selecting an icon. The technologies described herein select already installed location-specific apps for presentation to the user.

Each user of a mobile device has a limited knowledge and understanding of which location-specific apps are appropriate for a particular location. For example, a user who attends a minor league baseball game is likely unaware of an app that is particular to the ballpark that provides live statistics of the game. The user might not ever find the app by searching for it. The technologies described herein provide a selection of not-yet-installed location-specific apps. The selection of the apps may be based upon crowd-sourced information about usage of others at and near a particular location.

A mobile device has limited allocable resources, limited memory to allocate to active apps, and especially to those apps in the background. Also, a mobile device has limited battery life, and, generally, the greater number of active apps the greater the drain on the battery of the mobile device. The technologies described herein deactivate and/or uninstall particular apps on the device when the specific location associated with the particular apps is not at or near the current location.

Furthermore, the user likely only wants an app to notify him or her if such notification is relevant. When the user is away from a location associated with an active location-specific app, a notification from that app is typically not relevant, as with the New York City transit system example. The technologies described herein deactivate and/or adjust the notification provided by particular apps on the device when the specific location associated with the particular apps is not near.

Example Location-Aware App Management Scenarios

FIG. 1 shows an example set of scenarios 100 in which one or more implementations of the technology described herein may be employed. As depicted, the scenarios include four locations with a mobile device in operation at each location. User 102 is holding a smartphone 110 as he approaches his train in a metropolitan transit center 112 of a city that he is visiting for the first time. Another user (not shown) is with a cell phone 120 waiting during a layover at an airport 122. A hungry traveler (not shown) is using his tablet computer 130 while eating a restaurant 132. Still another user (not shown) has her smartphone 140 with her at home 142.

Each of these mobile devices is connected to a communications network 150 via a wireless connection. Such a connection can be Wi-Fi, Bluetooth, cellular, or the another. This connection links the mobile devices to the Internet, a private intranet, and/or to a so-called cloud. A database server 160 may be part of the Internet, a private intranet, or to a cloud, at least in part. Of course, the database server 160 can be implemented as one or more servers.

While referring to FIG. 1, various example scenarios 100 are discussed. When at the transit center 112, the user 102 uses several apps on his smartphone 110. Some of those might include some apps that are specific to the transit system of the city. For example, it might include an app with a subway train schedule. Using known or new techniques, the smartphone 110 determines its current location, which is the transit center 112.

That current location (the transit center 112) is associated with the apps that the user 102 used on the smartphone 110 while at that location. Other contextual factors of that use are associated with the app and the current location. For example, how much the app is used at that location, how often is it used at that location, how often it is downloaded at that location, how frequently the app is installed at that location, and the similar factors. In addition to use, some of the contextual factors may include ratings provided by users of apps at particular locations.

This associated information can be stored on the smartphone 110. In addition, such location-aware associations can be performed by many mobile devices at that transit center 112 over a period of time. Those various associations can be uploaded via the communications network 150 to the database server 160, where such associations are collected and organized. The information gathered about the various associations between the apps and locations, and perhaps contextual factors, can be called crowd-sourced since it is gathered from a crowd of users over time.

While waiting a few hours in the airport 122 for his connecting flight home, the user may wish to explore what is available to him at the airport. Using an implementation of the technology described herein, the cell phone 120 communicates its current location to the database server 160, which returns a list of apps that are specific to the current location of the phone 120. The apps can be listed in order of relevance based upon contextual factors associated with such apps in the database server 160.

Some of the recommended apps may already be installed on the cell phone. In that case, the user merely selects the already installed app that he wishes to run. Some of the recommended apps may need to be downloaded and installed before use on the cell phone 120.

Similar to the airport scenario, the hungry traveler can receive a list of recommended apps on his tablet computer 130 while dining at the restaurant 132. The traveler can choose to download a local news app and read that news while dining.

While carrying her smartphone 140, a user arrives at her home 142 in Spokane, Wash. after a business trip to New York City. While she was in New York City, she installed an app that gave her daily commute information about the city. Now she is home and not interested in receiving notices about daily commute in a city across the nation. Her smartphone 140 determines that its current location is not relevant to the location associated with the New York City daily commute app; consequently, the smartphone 140 automatically deactivates the app. Alternatively, it can uninstall the app or merely turn off the notifications coming from it.

Location Awareness

Location awareness involves the mobile device determining its present location. Conventional location-determination approaches include GPS and signal positioning (e.g., triangulation, trilateration, and other forms of interpolation and extrapolation) to determine geo-physical location relative to multiple signal sources. GPS are near-ubiquitous outdoor location technology and a GPS enabled typical smartphone has three to five meter accuracy. For signal positioning, the signal sources can use cellular or a variant of IEEE 802.11 (i.e., Wi-Fi). Signal-positioning approaches rely upon a map of signal sources whose locations are known to extrapolate a location of a device.

Rather than relying on signal-triangulation-based location approaches (like GPS) to determine geo-location with a fine-grain and absolute resolution, the technology described herein is based upon a location determination with a coarse grain and relative resolution. More particularly, the technology described herein utilizes determinations of logical or semantic locations.

One or more implementations include, for example, a mobile device recognizing and learning a frequented discrete location based on the "observed" ambient radio environment at that location. In particular, the mobile device can recognize and learn which ambient identifiable wireless ("IWS") sources are part of a topography within reception range at that discrete location.

A wireless access point (WAP) is a specific example of an ambient IWS source. The IWS sources are called ambient herein because they may be detected or "observed" in the environment while a mobile device moves about the world. The IWS sources are called "identifiable" because each is uniquely identifiable. For example, each WAP may be uniquely identified by its basic service set identification (BSSID) or media access card (MAC) address. Of course, other identifying characteristics may be used alone or in combination with each other or with the BSSID or MAC address. Examples of such other identifying characteristics include service set identification (SSID) and received signal strength indication (RSSI).

Geo-location, also called geo-physical location, includes determination of a real-world geographic location of an object or person. "Physical location" is a broader term than geo-location and includes a determination of any real-world location of the object or person.

Contextual Factors

As part of one or more implementations described herein, a mobile device can determine contextual factors. In short, a contextual factor is some observed, measured, calculated, and/or determined data about the circumstances or facts that surrounding the mobile device when it is active. A contextual factor answers some aspects of the questions that are typically asked when gathering information: how, who, what, when, where, and why.

In general, the determined present location of the mobile device is a contextual factor. However, herein the location (i.e., where) is a special case of a contextual factor that is handled separately. Consequently, as used herein, contextual factors explicitly exclude location of the mobile phone because that is handled separately. That said, contextual factor may include locations where the user is predicted to be traveling, estimated time/place of arrival, or route prediction.

An example of a contextual factor is the mode of travel of the user of the mobile device. Is the user walking, biking, riding bus or train, or in a motor vehicle? If walking, the user might, for example, want to see apps for a local bus schedule.

Another example of a contextual factor is the type of location. For example, if the user is determined to be at Spokane International Airport, is a type "airport" or more generally "transportation," consequently, apps associated with that type of location can be recommended to the user.

Another example of a contextual factor is the type of event happening at a location. For example, HP Pavilion in San Jose is home to the San Jose Sharks ice hockey team, but also hosts various concerts, shows, and events. In addition, a known schedule of events that occur at a particular location may be a contextual factor.

Another example of a contextual factor is the time/day at a particular location. For example, the apps recommended during the day on a workday for a particular location may differ from those recommended at night on the weekend at the same location.

Many of the contextual factors are based on app usage. The user builds a personal history of app usage at or near the determined location. Furthermore, many users generate a crowd-sourced history of app usage at or near the determined location. The route in which apps are used and the destination to which apps are used en route are other factors.

Some context factors may include, for example, crowd-sourced information about apps, such as ratings of apps.

Example of Location-Aware App Management Operation

Figure 2:
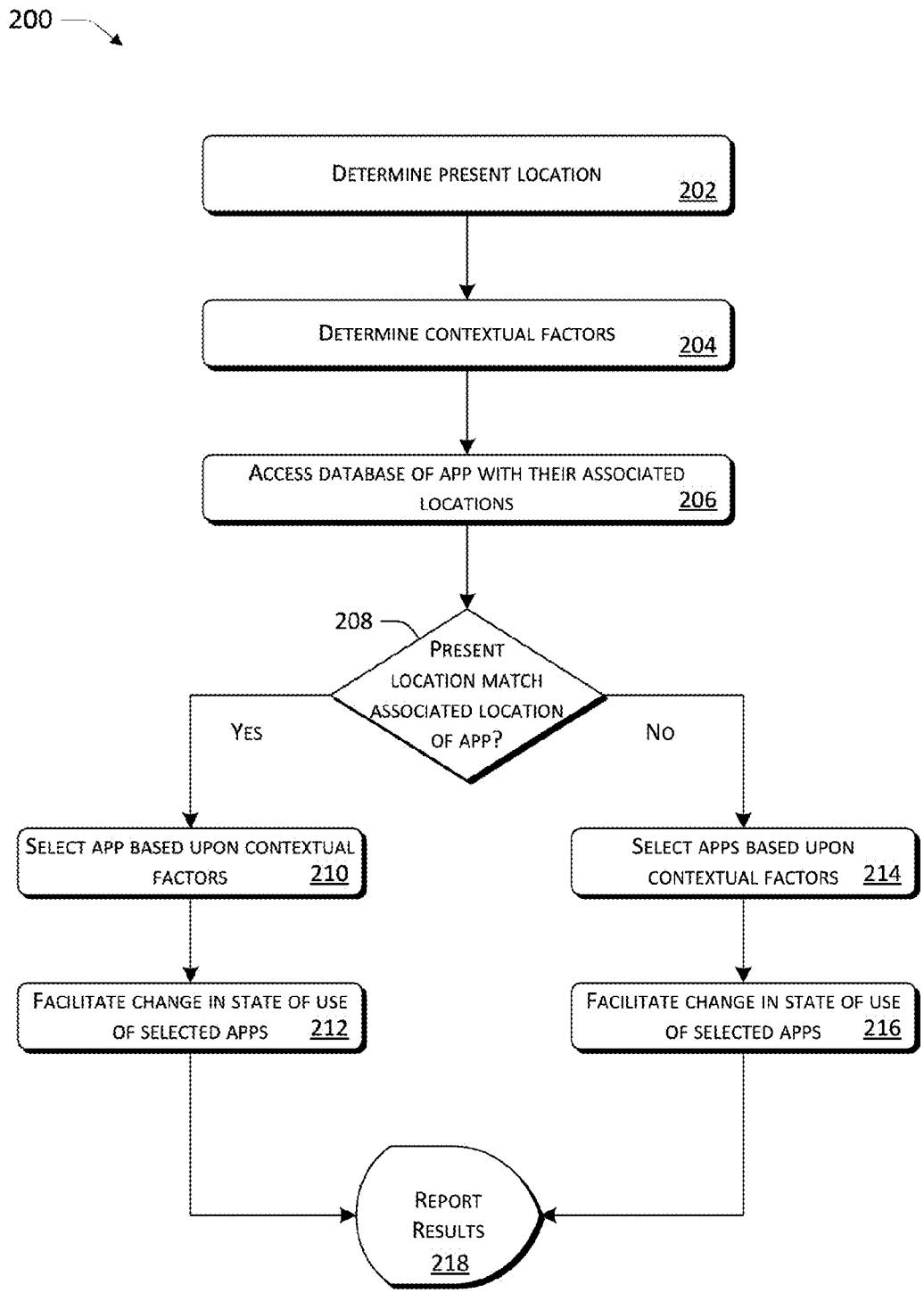
FIG. 2 is a flow chart illustrating an example method in accordance with the technologies described herein.

FIG. 2 illustrates an example process 200 for implementing, at least in part, the technology described herein. In particular, process 200 depicts an example of location-aware app-management operations performed, at least in part, by a mobile device, such as smartphone 110. Servers, such as a database server 160 or other cloud-based services may perform some portions of the example process 200.

At 202, a mobile device determines its present location using one or more of new or known location-awareness approaches. The determined location of the mobile device can be, for example, a physical location, a geo-location, or a logical location. The geo-location information can be obtained from a GPS. The location information can be obtained, at least in part, from one or more ambient IWS sources.

At 204, the mobile device determines contextual factors of the mobile device.

At 206, the mobile device accesses a database of app associations. The database provides an association between apps and their locations. In addition, the database may provide additional information about contextual factors associated with the apps and/or with locations. The database, or part thereof, can be stored locally on the mobile device itself. In some implementations the mobile device may access a remote database via a communications network. For example, the smartphone 110 accesses the database server 160 via a network 150. The database may include crowd-sourced information about apps. For example, the database may include a collection of app usage information and user-supplied ratings from many different users for apps used at or near locations.

At 208, the database provides a list of apps associated with the present location of the mobile device. In some implementations the list may include apps associated with the present location or with locations near the present location. Additionally or alternatively, the database provides a list of apps that are associated with different locations than that of the present location or nearby that location of the mobile device.

For apps associated with the present location, operations 210 and 212 are performed. For apps that are associated with a location other than the present location, operations 214 and 216 are performed.

At 210, the mobile device selects one or more apps that are associated with or are nearby the present location. If location is the only criterion, then, in some implementations, all the apps associated with the present location are selected. In some implementations the selecting may be based, at least in part, on contextual factors. In one or more implementations, the selection may include the mobile device querying the database to find a list of apps that are associated with the determined location and then the mobile device choosing one or more apps from the list of apps found by the query.

At 212, the mobile device facilitates a change-in-use state of one or more of the selected apps on the mobile device. A change-of-use state may include, for example, a change from use to nonuse, from active to inactive, from non-running to running, from installed to uninstalled, from not downloaded to downloaded, from user notification to no notification, and the like. A change-in-use state may include the opposite of each change listed above. That is, a change of use state may include, for example, a change from non-use to -use, from inactive to active, from running to non-running, from uninstalled to installed, from downloaded to not downloaded, from no user notification to user notification, and the like.

In one or more implementations, the facilitation may include presenting, via a user interface, one or more of the uninstalled apps to the user of the mobile device. Based upon the user input, mobile device installs one or more of the presented apps on the mobile device. In one or more implementations, the facilitation may include presenting, via a user interface, one or more of the inactive apps to a user of the mobile device. Based upon the user input, mobile device activates one or more of the presented apps on the mobile device. Such activation may include invoking execution of one or more of the selected apps on the mobile device. In one or more implementations, the facilitation may include deactivating one or more of the selected apps on the mobile device. In one or more implementations, the facilitation may include changing a user notification setting for one or more of the selected apps on the mobile device.

In some implementations the facilitation may perform a change of use of selected apps without user input. That is, the mobile device may automatically select to change the state of selected apps. This automation may be based upon settings for the device, for the user, and/or for the particular apps of the selected apps.

Instead of apps that are associated with the present location, the mobile device may act upon apps that are associated with a different location than the present location. For apps that are associated with a location other than the present location, operations 214 and 216 are performed.

At 214, the mobile device selects one or more apps that are associated with a location that is different from the present location. In some implementations the mobile device may select those apps that are associated with a location far from the present location. The threshold of how far can be determined by known or calculable distances between present and associated locations exceeding a distance threshold. Alternatively, the database may designate nearby locations for apps or for specific locations.

If location is the only criterion, then, in some implementations, all the apps associated with a location other than the present location are selected. In some implementations the selecting may be based, at least in part, upon the contextual factors. In one or more implementations, the selection may include the mobile device querying the database to find a list of apps that are associated a location other than the determined location and then the mobile device choosing one or more apps from the list of apps found by the query. In one or more implementations, the selection may be based, at least in part, on apps which are installed on the device.

At 216, the mobile device facilitates a change-in-use state of one or more of the selected apps on the mobile device. A change-of-use state here is the same as that discussed for operation 212.

In one or more implementations, the facilitation may include presenting, via a user interface, one or more of the installed apps to a user of the mobile device. Based upon the user input, the mobile device uninstalls one or more of the presented apps on the mobile device. In one or more implementations, the facilitation may include presenting, via a user interface, one or more of the active apps to the user of the mobile device. Based on the user input, mobile device deactivates one or more of the presented apps on the mobile device. Such deactivation can include ending execution of one or more of the selected apps. In one or more implementations, the facilitation can include changing a user notification setting for one or more of the selected apps on the mobile device.

In some implementations the facilitation may perform change of use for selected apps without user input. That is, the mobile device can automatically select to change the state of selected apps. This automation can be based on settings for the device, for the user, and/or for the particular apps of the selected apps.

At 218, the mobile device reports results of the facilitation. Such a report may be presentation of a screen of icons for apps relevant to the present location.

Another Example of Location-Aware App Management Operation

Figure 3:
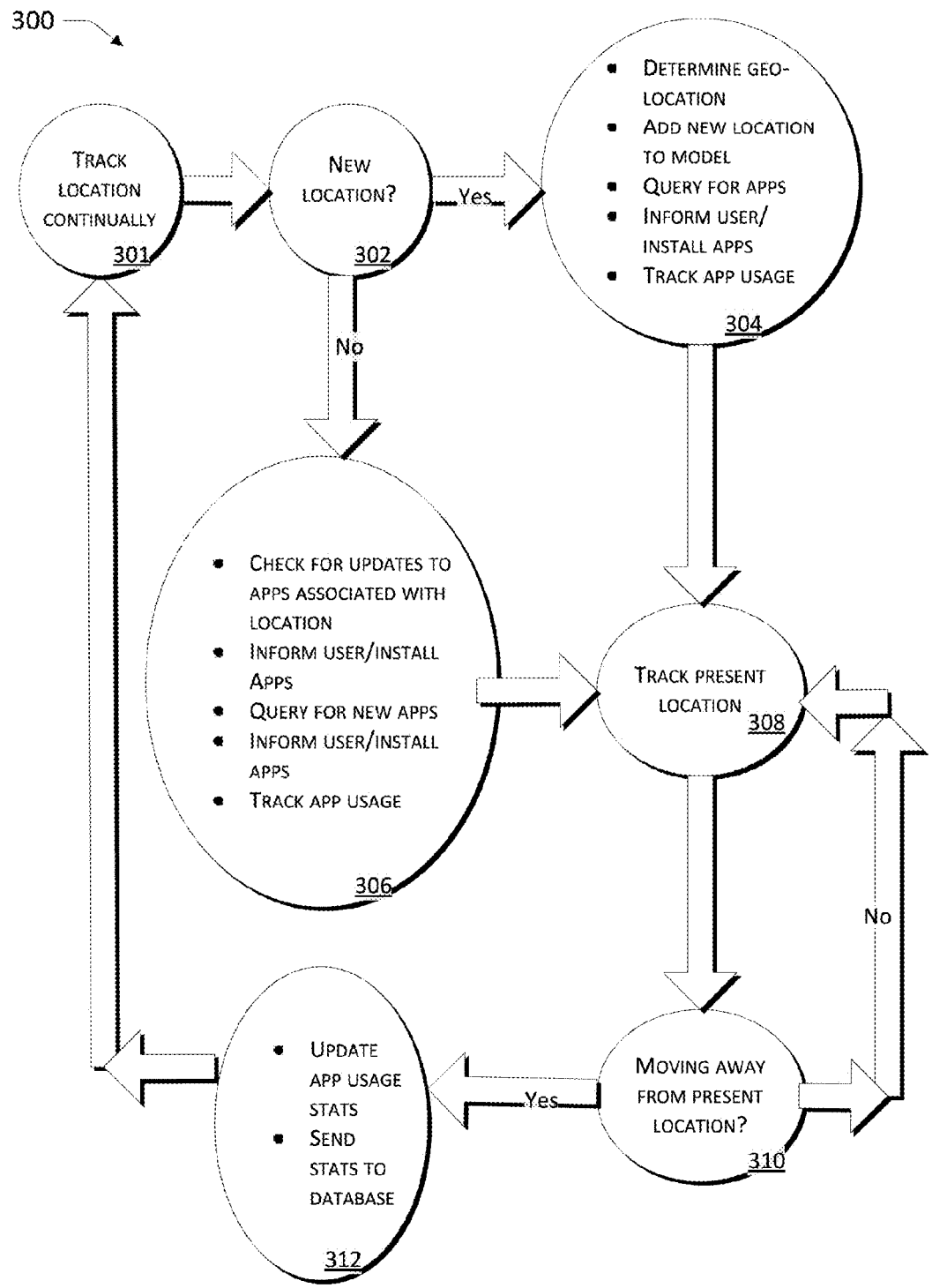
FIG. 3 is a state diagram illustrating an example method in accordance with the technologies described herein.

FIG. 3 illustrates a state diagram 300 of an example process for implementing, at least in part, the technology described herein. In particular, state diagram 300 depicts an example of location-aware app management operation performed, at least in part, by a mobile device, such as a smartphone 110. Servers, such as a database server 160 or other cloud-based services may perform some portions of the state diagram 300.

At 301, a mobile device tracks its location continually until the device determines that the user arrives a new location.

At 302, when a user arrives at a new location that he or she has never visited with the mobile device before, the mobile device determines that this is a place that the user has not visited before. That is, this location is a new location. In one or more implementations, the determination of the place at which a user arrives can be predicted before arrival if the user is traveling to a known location. In this situation, the device can enter state 302 and then 304 prior to the user's arrival.

At 304, the mobile device determines the geo-location and queries a location-aware database to get a list of apps associated with the new location. The mobile device presents this list to the user and installs the applications desired by the user. The mobile device adds this new place to a model of location-aware apps, which may involve updating the database of such apps. The mobile device tracks the usage of apps while the user remains at this location.

At 306, when the user arrives at a place that he or she has previously visited, the mobile device checks for updates to apps associated with this location and activates those apps. In addition, the device may also query the database to find new or better apps and may inform the user or install/activate them. The mobile device tracks the usage of apps while the user remains at this location.

At 308 and 310, the mobile device continues to track user location until the user moves away from the location. If the user moves away from the location, then the device moves to state 312.

At 312, the mobile device updates usage statistics and sends the statistics to the service.

Example System

Figure 4:
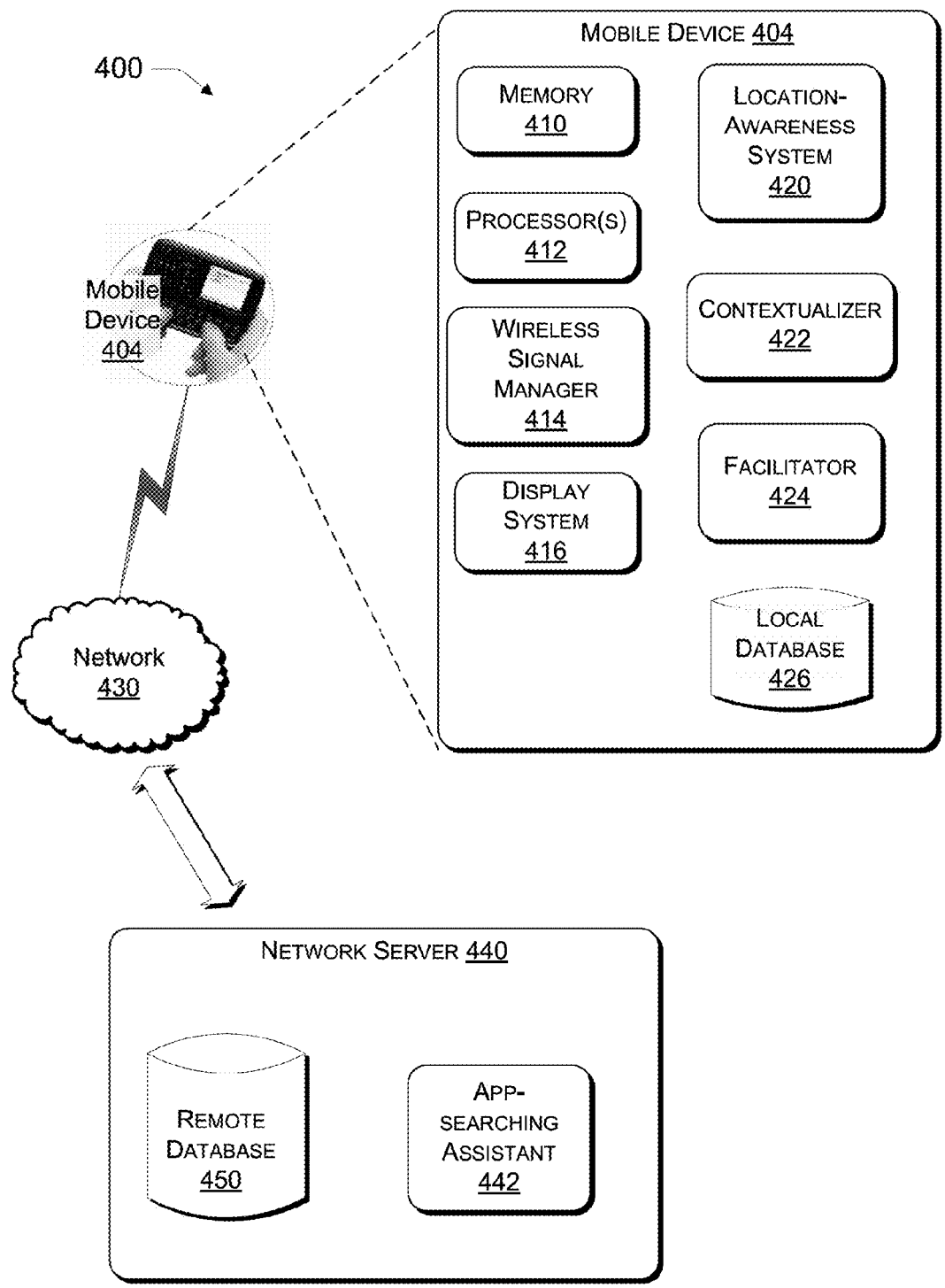
FIG. 4 illustrates an example system in accordance with the technologies described herein.

FIG. 4 illustrates example system 400 for implementing the technology described herein. The system 400 includes a mobile device 404, a network 430, and a network or cloud-based server 440. The mobile device 404 may be the same as or similar to mobile devices 110, 120, 130, and 140, which have already been introduced. The cloud-based server 440 may be the same as or similar to the database server 160, which has already been introduced.

The mobile device 404 includes a memory 410, one or more processor(s) 412, a wireless-signal manager 414, a display system 416, a location-awareness system 420, a contextualizer 422, an app-management facilitator 424, and local database 426. These functional components can be separate or some combination of hardware units. Alternatively, the components can be implemented, at least in part, in software and thus be stored in the memory 410 and executed by the processors 412.

The wireless signal manager 414 handles all wireless signals sent or received by the device. For example, wireless signal manager 414 handles the communications via the network 430. The wireless signal manager 414 especially handles signal management that aid in location awareness. For example, the wireless signal manager 414 may include the GPS components, cellular transceivers, and Wi-Fi transceivers.

The display system 416 includes the display itself and the graphics system to drive that display. The location-awareness system 420 uses one or more of the existing and/or new location-awareness approaches to determine the present location of the mobile device 404. The contextualizer 422 determines the contextual factors. The app-management facilitator 424 facilitates and manages the use-state-change of the selected apps. The local database 426 stores relevant data, such as the associations between known locations and installed apps. The app-management facilitator 424 may perform, facilitate performance of the use-state-changes discussed in regard to operations 212 and 216 herein.

The network 430 can be a wired and/or wireless network. It can include the Internet infrastructure and it may be presented as the cloud. The network 430 includes wired or wireless local area networks, a cellular network, and/or the like. The network 430 links the mobile device 404 with the network server 440. Some implementations of the technology described here operate without assistance from the network.

The network or cloud-based server 440 provides assistance to the mobile device 404 as part of one or more implementations of the technology described herein. In some implementations, the network 430 and network server 440 are not used. The network server 440 can be one or more actual servers.

The network server 440 includes an app-searching assistant 442 and a remote database 450. The app-searching assistant 442 helps locate relevant apps for a query submitted by the mobile device 404.

The remote database 450 stores associations between apps, locations, and/or contextual factors. These associations can be collected from many mobile devices, such as the mobile device 404.

As depicted and discussed, the wireless devices 110, 120, 140, and 404 are mobile phones. However, devices can be other types of portable devices, such as smartphones, cell phones, tablet computers, any wireless-enabled wearable devices, laptop computers, netbook computers, or the like.

Example Computing Device

Figure 5:
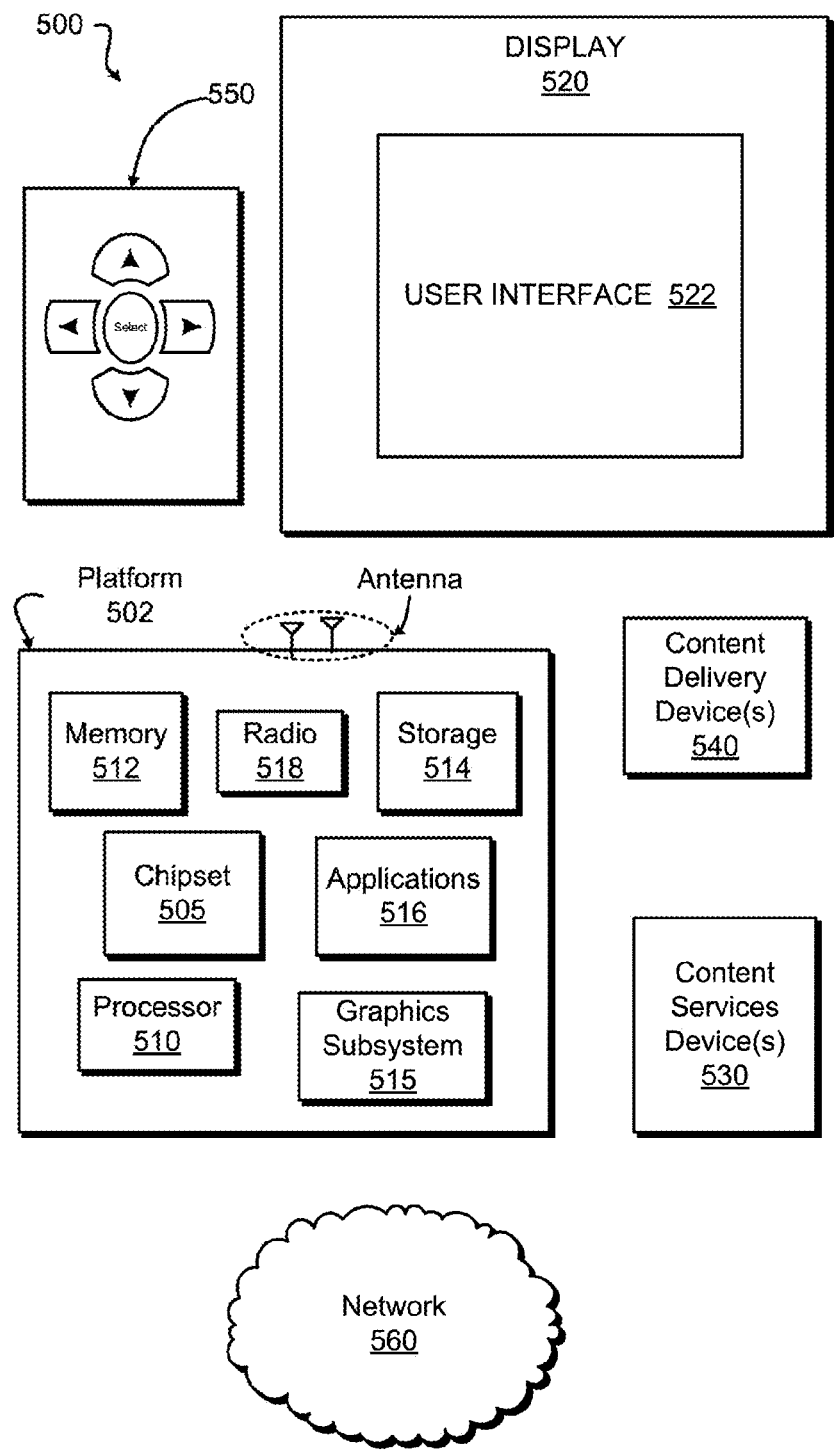
FIG. 5 illustrates an example computing device to implement in accordance with the technologies described herein.

FIG. 5 illustrates an example system 500 that may implement, at least in part, the technologies described herein. In various implementations, system 500 is a media system, although system 500 is not limited to this context. For example, system 500 can be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, or smart television), mobile internet device (MID), messaging device, data communication device, and so forth.

In various implementations, system 500 includes a platform 502 coupled to a display 520. Platform 502 receives content from devices such as content services device 530, content delivery device 540, or other similar content sources. A navigation controller 550 including one or more navigation features may be used to interact with, for example, platform 502 and/or display 520.

In various implementations, platform 502 includes any combination of a chipset 505, a processor 510, memory 512, storage 514, a graphics subsystem 515, applications 516 and/ or radio 518. Chipset 505 provides intercommunication among processor 510, memory 512, storage 514, graphics subsystem 515, application 516, and/or radio 518. For example, chipset 505 can include a storage adapter (not depicted) capable of providing intercommunication with storage 514.

Processor 510 may be implemented as a complex instruction set computer (CISC) or reduced instruction set computer (RISC) processors, x86 instruction set compatible processors, multicore, or any other microprocessor or central processing unit (CPU). In various implementations, processor 510 may be dual-core processors, dual-core mobile processors, and so forth.

Memory 512 may be implemented as a volatile memory device such as, but not limited to, a random access memory (RAM), dynamic random access memory (DRAM), or static RAM (SRAM).

Storage 514 may be implemented as a nonvolatile storage device such as, but not limited to, a magnetic disk drive, optical disk drive, tape drive, an internal storage device, an attached storage device, flash memory, battery backed-up synchronous DRAM (SDRAM), and/or a network accessible storage device. In various implementations storage 514 includes technology to increase the storage performance-enhanced protection for valuable digital media when multiple hard drives are included.

Graphics subsystem 515 processes of images such as still or video for display. Graphics subsystem 515 can be a graphics processing unit (GPU) or a visual processing unit (VPU), for example. An analog or digital interface may be used to communicatively couple the graphics subsystem 515 and the display 520. For example, the interface can be a high-definition multimedia interface, display port, wireless high definition media interface (HDMI), and/or wireless HD-compliant techniques. Graphics subsystem 515 may be integrated into processor 510 or chipset 505. In some implementations graphics subsystem 515 may be a stand-alone card communicatively coupled to chipset 505.

The graphics and/or video processing techniques described herein are implemented in various hardware architectures. For example, graphics and/or video functionality may be integrated within a chipset. Alternatively, a discrete graphics and/or a video processor may be used. As still another implementation, the graphics and/or video functions may be provided by a general-purpose processor, including a multicore processor. In further embodiments, the functions may be implemented in a consumer electronics device.

Radio 518 may include one or more radios capable of transmitting and receiving signals using various suitable wireless communications techniques. Such techniques involve communications across one or more wireless networks. Example wireless networks include, but are not limited to, wireless local area networks (WLANs), wireless personal area networks (WPANs), wireless metropolitan area network (WMANs), cellular networks, and satellite networks. In communicating across such networks, radio 518 operates in accordance with one or more applicable standards in any version.

In various implementations display 520 includes any television-type monitor or display. Display 520 may include, for example, a computer display screen, touch-screen display, video monitor, television-like device, and/or a television. Display 520 can be digital and/or analog. In various implementations, display 520 may be a holographic display. In addition, display 520 may be a transparent surface that receives a visual projection. Such projections convey various forms of information, images, and/or objects. For example, such projections may be a visual overlay for a mobile augmented reality (MAR) application. Under the control of one or more software applications (516), platform 502 can display user interface 522 on display 520.

In various implementations, content services device(s) (530) may be hosted by any national, international, and/or independent service and thus accessible to platform 502 via the Internet. Content services device(s) (530) may be coupled to platform 502 and/or to display 520. Platform 502 and/or content services device(s) 530 may be coupled to a network 560 to communicate media information to and from the network 560. Content delivery device(s) 540 also may be coupled to platform 502 and/or to display 520.

In various implementations, content services device(s) 530 include a cable television box, personal computer, network, telephone, Internet-enabled devices, appliances capable of delivering digital information and/or content, and any other similar device capable of unidirectionally or bidirectionally communicating content between content providers and platform 502 and/display 520, via network 560 or directly. The content can be communicated unidirectionally and/or bidirectionally to and from any one of the components in system 500 and a content provider via a network 560. Examples of content include any media information including, for example, video, music, medical and gaming information, and so forth.

Content services device(s) 530 receive content such as cable television programming including media information, digital information, and/or other content. Examples of content providers include any cable or satellite television or radio or Internet content providers. The provided examples are not meant to limit implementations in accordance with the present disclosure in any way.

In various implementations platform 502 may receive control signals from navigation controller 550 having one or more navigation features. The navigation features of controller 550 may be used to interact with user interface 522, for example. In some embodiments, navigation controller 550 may be a pointing device such as a computer hardware component, specifically a human interface device, that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 can be replicated on a display (e.g., display 520) by movements of a pointer, cursor, focus ring, or other visual indicators displayed on the display. For example, under the control of software applications 516, the navigation features located on navigation controller 550 can be mapped to virtual navigation features displayed on user interface 522. In some embodiments, controller 550 may not be a separate component but may be integrated into platform 502 and/or display 520. The present disclosure, however, is not limited to the elements or in the context shown or described herein.

In various implementations, drivers (not shown) include technology to enable users to instantly turn on and off platform 502 like a television with the touch of a button after initial boot up, when enabled. Program logic allows platform 502 to stream content to media adaptors or other content services device(s) 530 or content delivery device(s) 540 even when the platform is turned off. In addition, chipset 505 includes hardware and/or software support for 5.1 surround sound audio and/or high definition 5.1 surround sound audio, for example. Drivers may include a graphics driver for integrated graphics platforms. In some embodiments the graphics driver may comprise a peripheral component interconnect (PCI) express graphics card.

In various implementations any one or more of the components shown in system 500 can be integrated. For example, platform 502 and content services device(s) 530 can be integrated, or platform 502 and content delivery device(s) (540) can be integrated, or platform 502, content services device(s) (530), and content delivery device(s) 540 can be integrated. In various embodiments, platform 502 and display 520 can be an integrated unit. Display 520 and content service device(s) 530 can be integrated, or display 520 and content delivery device(s) 540 can be integrated. These examples are not meant to limit the present disclosure.

In various embodiments system 500 can be implemented as a wireless system, a wired system, or a combination of both. When implemented as a wireless system, system 500 can include components and interfaces suitable for communicating over a wireless shared media, such as one or more antennae, transmitters, receivers, transceivers, amplifiers, filters, control logic, and so forth. An example of wireless shared media includes portions of a wireless spectrum, such as the RF spectrum. When implemented as a wired system, system 500 can include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media can include a wire, cable, metal leads, printed circuit board (PCB), backplane, switch fabric, semiconductor material, twisted-pair wire, coaxial cable, fiber optics, and others.

Platform 502 can establish one or more logical or physical channels to communicate information. The information includes media information and control information. Media information refers to any data representing content meant for a user. Examples of content include data from a voice conversation, videoconference, streaming video, electronic mail ("e-mail") message, voice-mail message, alphanumeric symbols, graphics, image, video, text, and so on. Data from a voice conversation can be, for instance, speech information, silence periods, background noise, comfort noise, tones, and other similar items. Control information refers to any data representing commands, instructions, or control words meant for an automated system. For example, control information can be used to route media information through a system, or instruct a node to process the media information in a predetermined manner. The embodiments, however, are not limited to the elements or in the context shown or described in FIG. 5.

As described above, system 500 can be embodied in varying physical styles or form factors. FIG. 5 illustrates implementations of a small form-factor device 500 in which system 500 can be embodied. In embodiments, for example, device 500 can be implemented as a mobile computing device having wireless capabilities. A mobile computing device may refer to any device having a processing system and a mobile power source or supply, such as one or more batteries.

Examples of a mobile computing device, in addition to those already mentioned, also may include computers that are arranged to be worn by a person, such as a wrist computer, finger computer, ring computer, eyeglass computer, belt-clip computer, arm-band computer, shoe computers, clothing computers, and other wearable computers. In various embodiments, a mobile computing device can be implemented as a smart phone capable of executing computer applications, as well as voice communications and/or data communications. Although some embodiments can be described with a mobile computing device, other embodiments can be implemented using other wireless mobile computing devices as well. The embodiments are not limited in this context.

Figure 6:
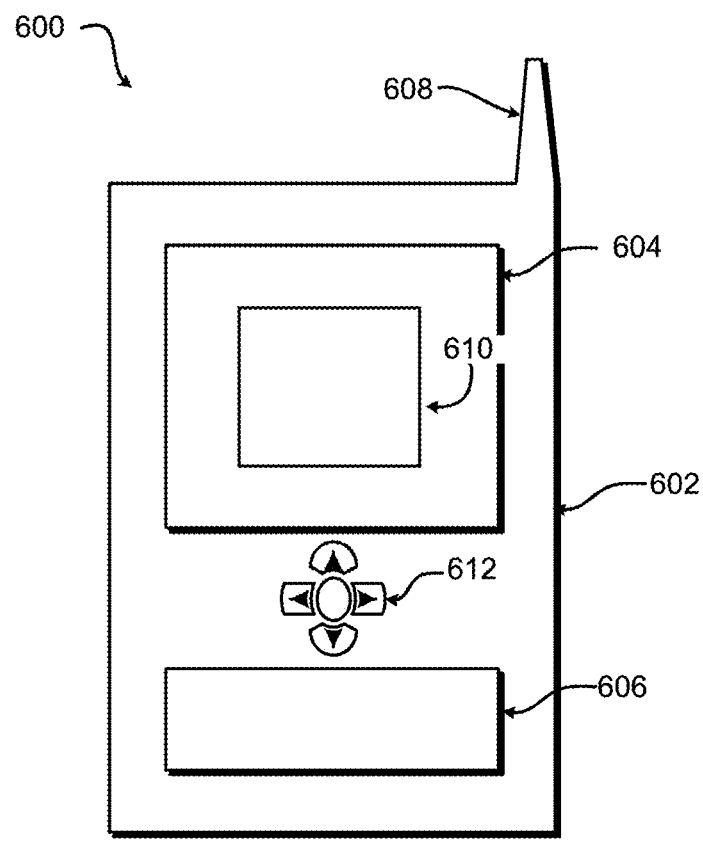
FIG. 6 illustrates an example device to implement in accordance with the technologies described herein.

As shown in FIG. 6, device 600 includes a housing 602, a display 604, an I/O device 606, and an antenna 608. Device 600 also includes navigation features 612. Display 604 includes any suitable display unit for displaying information appropriate for a mobile computing device. I/O device 606 includes any suitable I/O device for entering information into a mobile computing device. Examples for I/O device 606 include an alphanumeric keyboard, a numeric keypad, a touch pad, input keys, buttons, switches, rocker switches, microphones, speakers, voice recognition device and software, and others. Information also can be entered into device 600 by way of microphone (not shown). Such information is digitized by a voice recognition device (not shown). The embodiments are not limited in this context.

Various embodiments can be implemented using hardware elements, software elements, or a combination of both. Examples of hardware elements include processors, microprocessors, circuits, circuit elements (e.g., transistors, resistors, capacitors, inductors, etc.), integrated circuits, application specific integrated circuits (ASIC), programmable logic devices (PLD), digital signal processors (DSP), field programmable gate array (FPGA), logic gates, registers, semiconductor device, chips, microchips, chip sets, and more. Examples of software include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements varies in accordance with any number of factors, such as desired computational rate, power levels, heat tolerances, processing cycle budget, input data rates, output data rates, memory resources, data bus speeds, and other design or performance constraints.

One or more aspects of at least one embodiment can be implemented by representative instructions stored on a machine-readable medium that represents various logic within the processor, which when read by a machine causes the machine to fabricate logic to perform the techniques described herein. Such representations, known as "IP cores" can be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are demonstrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Additional and Alternative Implementation Notes

In general, a mobile device is a small, hand-held, portable computing device that typically has a display screen and some user input mechanism (e.g., touch screen or keyboard). Often they weigh less than two pounds. Often, they are equipped with wireless communications capabilities, such as WiFi, Bluetooth, and cellular. Examples of implementations of a mobile device include a smartphone, a tablet computer, a feature phone, a personal digital assistant (PDA), any wireless-enabled wearable devices, laptop computers, netbook computers, or other so-called handheld devices or computers.

Unless the context indicates otherwise, the following terms should be understood to be based, at least in part, upon the description provided as follows. An example of an active or activated app includes an app that is executing on the mobile device in the foreground or background. An example of an app that is in use includes an activated app that is being used by the user in the foreground. An example of an installed app includes an app that is downloaded to the mobile device and is ready for use or activation on the device. An example of a yet-to-be-installed app includes an app that is not ready for use or activation on the device. Such an app typically has not yet been downloaded to the device, but may be in some instances.

An example of an inactive or deactivated app includes an app that is not executing on the mobile device in either the foreground or background. An example of an app that is not in use includes an activated app that is not being used by the user in the foreground. An example of an uninstalled app includes an app is not ready for use or activation on the device. An uninstalled app typically has been deleted from the device, but may still be present on the device in some instances.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the execution of the instructions on the medium may cause performance of the operations described herein.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk [CD] and digital versatile disk [DVD]), smart cards, flash memory devices (e.g., thumb drive, stick, key drive, and SD cards), and volatile and nonvolatile memory (e.g., random access memory [RAM], read-only memory [ROM]).

What is claimed is:

1. A mobile device comprising:
   a location-awareness system configured to determine a location of the mobile device;
   an app-management facilitator configured to:
   select one or more mobile applications ("apps") that are associated with a location other than the determined location, wherein the selected apps include installed and not-yet-installed apps;
   facilitate a change in use state of one or more of the selected apps on the mobile device;
   wherein the facilitating includes actions selected from a group consisting of installing one or more of the selected apps on the mobile device, activating one or more of the selected apps on the mobile device, invoking one or more of the selected apps on the mobile device, uninstalling one or more of the selected apps on the mobile device, deactivating one or more of the selected apps on the mobile device, and changing a user notification setting for one or more of the selected apps on the mobile device.

2. The mobile device as recited by claim 1, further comprising a contextualizer configured to determine contextual factors of the mobile device, the app-management facilitator being further configured to select based, at least in part, upon the determined contextual factors.

3. The mobile device as recited by claim 2, wherein the contextual factors are selected from a group consisting of mode of travel of a user of the mobile device, crowd-sourced ratings of apps, personal history of app usage at or near the determined location, crowd-sourced history of app usage at or near the determined location, identification of type of the determined location, and identification of the type of event happening at the location.

4. The mobile device as recited by claim 1, wherein the determined location of the mobile device is selected from a group consisting of a physical location, geo-location, and a logical location.

5. The mobile device as recited by claim 1, wherein the location-awareness system is further configured to determine the location using, at least in part, geo-location information obtained from a global positioning system (GPS).

6. The mobile device as recited by claim 1, wherein the location-awareness system is further configured to determine the location using, at least in part, location information obtained from one or more ambient identifiable wireless signal (IWS) sources.

7. The mobile device as recited by claim 1, wherein the app-management facilitator is further configured to deactivate one or more of the selected apps on the mobile device.

8. The mobile device as recited by claim 1, wherein the app-management facilitator is further configured to change a user notification setting for one or more of the selected apps on the mobile device.

9. A method of location-aware mobile application selection and management, the method comprising:
   determining a location of a mobile device;
   selecting one or more mobile applications ("apps") that are associated with a different location than the determined location, wherein the selected apps include installed and not-yet-installed apps;
   facilitating a change in use state of one or more of the selected apps on the mobile device;
   wherein the facilitating includes actions selected from a group consisting of installing one or more of the selected apps on the mobile device, activating one or more of the selected apps on the mobile device, invoking one or more of the selected apps on the mobile device, uninstalling one or more of the selected apps on the mobile device, deactivating one or more of the selected apps on the mobile device, and changing a user notification setting for one or more of the selected apps on the mobile device.

10. The method as recited by claim 9, wherein the facilitating includes notifying a user regarding one or more of the selected apps on the mobile device being associated with a different location than the determined location.

11. The method as recited by claim 9, wherein the facilitating includes:
    presenting, via a user interface, one or more of the selected apps to a user of the mobile device, wherein one or more of the presented apps are installed on the mobile device;
    obtaining an input from the user to un-install one or more of the presented apps on the mobile device.

12. The method as recited by claim 9, wherein the facilitating includes un-installing one or more of the selected apps on the mobile device.

13. The method as recited by claim 9, wherein the facilitating includes:
    presenting, via a user interface, one or more of the selected apps to a user of the mobile device, wherein one or more of the presented apps are active on the mobile device;
    obtaining an input from the user to deactivate one or more of the presented apps on the mobile device.

14. The method as recited by claim 9, wherein the facilitating includes deactivating one or more of the selected apps on the mobile device.

15. The method as recited by claim 9, wherein the facilitating includes changing a user notification setting for one or more of the selected apps on the mobile device.

16. One or more non-transitory computer-readable media with processor-executable instructions stored thereon which when executed by one or more processors cause performance of operations comprising:
   determining a location of a mobile device;
   selecting one or more mobile applications ("apps") that are associated with a different location than the determined location, wherein the selected apps include installed and not-yet-installed apps;
   facilitating a change in use state of one or more of the selected apps on the mobile device;
   wherein the facilitating includes actions selected from a group consisting of installing one or more of the selected apps on the mobile device, activating one or more of the selected apps on the mobile device, invoking one or more of the selected apps on the mobile device, uninstalling one or more of the selected apps on the mobile device, deactivating one or more of the selected apps on the mobile device, and changing a user notification setting for one or more of the selected apps on the mobile device.

17. One or more non-transitory computer-readable media as recited by claim 16, wherein the facilitating includes notifying a user regarding one or more of the selected apps on the mobile device being associated with a different location than the determined location.

18. One or more non-transitory computer-readable media as recited by claim 16, wherein the facilitating includes:
   presenting, via a user interface, one or more of the selected apps to a user of the mobile device, wherein one or more of the presented apps are installed on the mobile device;
   obtaining an input from the user to un-install one or more of the presented apps on the mobile device.

19. One or more non-transitory computer-readable media as recited by claim 16, wherein the facilitating includes un-installing one or more of the selected apps on the mobile device.

20. One or more non-transitory computer-readable media as recited by claim 16, wherein the facilitating includes:
   presenting, via a user interface, one or more of the selected apps to a user of the mobile device, wherein one or more of the presented apps are active on the mobile device;
   obtaining an input from the user to deactivate one or more of the presented apps on the mobile device.

21. One or more non-transitory computer-readable media as recited by claim 16, wherein the facilitating includes deactivating one or more of the selected apps on the mobile device.

22. One or more non-transitory computer-readable media as recited by claim 16, wherein the facilitating includes changing a user notification setting for one or more of the selected apps on the mobile device.

* * * * *